United States Patent
Park et al.

(10) Patent No.: US 9,741,044 B2
(45) Date of Patent: Aug. 22, 2017

(54) DEMAND RESPONSE SYSTEM AND METHOD USING A SMART PORTAL

(75) Inventors: Kyoung Min Park, Seoul (KR); Ji Young Park, Gwangmyeong-si (KR); Woo Young Park, Seoul (KR); Tae Hun Kim, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 1175 days.

(21) Appl. No.: 13/524,936

(22) Filed: Jun. 15, 2012

(65) Prior Publication Data

US 2012/0259749 A1   Oct. 11, 2012

Related U.S. Application Data

(63) Continuation of application No. PCT/KR2010/009101, filed on Dec. 20, 2010.

(30) Foreign Application Priority Data

Dec. 18, 2009 (KR) .................... 10-2009-0126685

(51) Int. Cl.
*G06Q 30/02* (2012.01)

(52) U.S. Cl.
CPC .............. *G06Q 30/02* (2013.01); *Y04S 50/14* (2013.01)

(58) Field of Classification Search
CPC ................................. G06Q 30/02; Y04S 50/14
See application file for complete search history.

(56) References Cited

U.S. PATENT DOCUMENTS

2008/0177678 A1*  7/2008  Di Martini ............. G01D 4/002
                                                         705/412
2009/0048901 A1   2/2009  Richard et al.
                          (Continued)

FOREIGN PATENT DOCUMENTS

JP     10-340051     12/1998
JP    2007-219841     8/2007
                    (Continued)

OTHER PUBLICATIONS

International Search Report mailed Aug. 2, 2011 for PCT/KR2010/009101.
(Continued)

*Primary Examiner* — H Rojas
(74) *Attorney, Agent, or Firm* — Hauptman Ham, LLP

(57) ABSTRACT

The demand response system comprises an automatic meter reading (AMR) unit to generate metering information. The demand response system comprises a multiple utility complex unit (MUC) which provides DR information based on the metering information and manages utility supply schedule in combination. The demand response system comprises an eco index (EI) calculation unit which calculates an eco index based on the metering information. The demand response system comprises a demand response (DR) unit which obtains the CBL information based on the metering information and computes a the DR bill by using the CBL data, the DR information and EI obtained, and outputs the DR bill. The demand response system comprises a smart portal (SP) unit which provides users with the calculated DR bill. According to the disclosure, the demand response system can provide environmental and social information, in addition to economic information.

2 Claims, 5 Drawing Sheets

(56) References Cited

U.S. PATENT DOCUMENTS

| | | | |
|---|---|---|---|
| 2010/0060479 A1* | 3/2010 | Salter | G01D 4/002 |
| | | | 340/870.4 |
| 2010/0076835 A1* | 3/2010 | Silverman | G06Q 10/06 |
| | | | 705/14.33 |
| 2010/0228601 A1* | 9/2010 | Vaswani | G06Q 10/06 |
| | | | 705/308 |

FOREIGN PATENT DOCUMENTS

| | | |
|---|---|---|
| JP | 2008-247601 | 10/2008 |
| KR | 10-2009-0032411 | 4/2009 |
| KR | 10-2009-0057221 | 6/2009 |

OTHER PUBLICATIONS

Korean Office Action from KIPO mailed Oct. 30, 2011 for Korean Patent Application 10-2009-0126685.

\* cited by examiner

DEMAND RESPONSE SYSTEM AND METHOD USING A SMART PORTAL

CROSS REFERENCE TO RELATED APPLICATION

Related Applications

The present application is a continuation of International Application Number PCT/KR2010/009101 filed Dec. 20, 2010, the disclosure of which is hereby incorporated by reference herein in their entirety. Further, this application claims the priority of Korean Patent Application No. 10-2009-0126685, filed on Dec. 18, 2009 in the KIPO (Korean Intellectual Property Office), the disclosure of which are incorporated herein in their entirety by reference.

TECHNICAL FIELD

The disclosure relates to a demand response system and method using a smart portal in order to combine and manage utilities, such as water/sewage, gas, electricity, and heating/air-conditioning, within a local area. More particularly, the disclosure relates to a demand response system and method using a smart portal, which calculate a Customer Baseline Load (hereinafter referred to as a 'CBL') based on the analysis of usage data and provides a customer with information on a DR billing plan for a utility use by taking the calculated CBL into consideration via a smart portal such that the customer can control the utilities' demand for himself in order to efficiently manage user demands by changing the existing utility 'supply' system (i.e., 'billing for the past use') into a utility 'purchase' system (i.e., 'pre-billing for the future use').

BACKGROUND

The existing utilities, such as water/sewage, electricity, gas, and heating/air-conditioning, have been recognized as social accommodation equipment provided by a local administrator (government). Accordingly, to use utility service has been performed in the form of paying a demanded bill after using provided service without a consumer's rational selection. Furthermore, a utility system must be managed in the entire system's respect as an organic connection relationship, but a supplier and a consumer for each utility have a 1:1 relationship. A concept that came into being existence in order to solve the existing utility system problems, a stably energy supply, an expected increase of electricity demands according to electric vehicle technology, a restriction to carbon emissions according to Kyoto protocol, environmental protection, and a need for the use of new and renewal energy is a smart grid.

The smart grid manages a utility system not as a part, but as the whole. Utilities and energy resources do not exist only in one form. The utilities and energy resources are converted into various forms in production, transfer, use, and processing processes. The smart grid adopts a method of reducing the entire consumption of energy by managing this flow on the whole. Furthermore, in order to stably supply energy, the smart grid is trying to find a method of converting the existing system, forming 'peak+extra' equipment, into a system for lowering the peak and uniformly maintaining the total energy consumption. Here, a Demand Response (hereinafter referred to as a 'DR') concept comes into being existence.

The DR refers to a concept in which a customer is provided with compensation (incentives, a bill, etc.) information on a utility use so that the customer can control demands for himself. The core factors of the DR include a CBL, demand prediction, and a DR billing plan.

First, a CBL has to be calculated by analyzing the existing use form of a user and demands have to be predicted based on the calculated CBL. Furthermore, a DR billing plan for lowering demands up to a target level based on the predicted demands has to be provided.

In general, information provided by a DR system becomes a usage bill that is most sensitive to a user. However, information generated by all the smart grid systems is various, and the amount of reduction of an actual bill is not great. Compensation for active management has been known as being a bill of a meager level.

A representative one of pieces of information generated by the smart grid system may be an Eco Index (EI). The EI is an index obtained by converting a degree that an environment is protected and damaged (polluted) from a viewpoint of utility generation/use. A representative example of the index is carbon emissions, etc.

In a smart grid environment, peak management is performed according to the DR policy of a customer. A DR system provides a user with information and expects the user's active participation through economic and eco-friendly consciousness.

In the existing DR system, however, first, provided information is restricted to a bill. As an example of an actual DR, the existing DR system has a significant cost reduction effect in terms of equipment investment, environmental preservation expenses, and a use bill from a national aspect, but actually has a bill reduction effect of several thousand Won per month for a consumer. It is insufficient for an active motive of customers. Information generated by the smart grid and the DR system includes various pieces of information, such as primary information, including the amount used, the amount planned, and a history, secondary information, including a bill, usage ranking, an EI, and an attained planned ratio, and bill ranking.

In the existing DR system, second, a method of providing information is simple (i.e., a form of post). In order to increase the response ratio of a consumer, it is necessary to collectively use a passive form of post and an active form of official announcement (push, notice, and alert) through various contact points.

DISCLOSURE

Technical Problem

An object of the disclosure is to provide a demand response system and method using a smart portal, an AMR (Automatic Meter Reading) unit, an MUC (Multiple Utility Complex) unit, an EI (Eco Index) calculation unit, a DR (Demand Response) unit, an SP (Smart Portal) unit, a demand response service method of the EI calculation unit, and a demand response service method of the DR unit, in which a CBL is calculated based on the analysis of usage data and information on a DR billing plan for a utility use is provided to a customer by taking the calculated CBL into consideration by using a smart portal such that the customer can control demands for himself in order to efficiently manage user demands by changing the existing utility 'supply' system (i.e., 'billing for the past use') into a utility 'purchase' system (i.e., 'pre-billing for the future use') in a smart grid environment where utilities, such as water/sewage, gas, electricity, and heating/air-conditioning, are combined and managed within an area.

Technical Solution

A demand response system using a smart portal according to an embodiment for achieving the above object comprises an Automatic Meter Reading (AMR) unit for generating metering information by reading each consumer's utility meters, a Multiple Utility Complex (MUC) unit for providing information on Demand Response (DR) bill calculations based on the metering information and manages utilities in complex, an Eco Index (EI) calculation unit for calculating an EI customized for the each customer based on the metering information, a DR unit for calculating Customer Baseline Load (CBL) information based on the metering information, calculating a DR bill by using the calculated CBL information, the DR information, and the EI, and outputting the DR bill, and a Smart Portal (SP) unit for providing the user with the calculated DR bill in a specific form.

Meanwhile, the MCU unit according to the embodiment for achieving the above object comprises a communication unit for communicating with the AMR unit and the DR unit, a utility management unit for collectively managing the utilities which is the subject of meter reading of the AMR unit, a DR information supply unit for providing the information on the DR bill calculations, including limit price information, income correction information, and CBL setting information for each utility, and a control unit for controlling the management of the each utility and the providing of the information on the DR bill calculations for the each utility.

Meanwhile, the EI calculation unit according to the embodiment for achieving the above object comprises a communication unit for communicating with the AMR unit and the DR unit, an EI calculation unit for calculating the EI customized for the each consumer based on the metering information received from the AMR unit, and a control unit for performing control so that the calculated EI is transferred to the DR unit.

Here, the EI includes economic information, environmental information, and social information.

Furthermore, the economic information includes a use history and information on a bill and meters.

Furthermore, the EI classified into a customer EI, a utility supplier EI, and a city EI, and the EI comprises an environmental information index, an Eco-friendly behavior index, and a utility consumption/supply efficiency index.

Furthermore, the social information is ranking information on the economic information and the environmental information, and the social information includes information on EIs of an individual and a city, a bill, and meters.

Meanwhile, the DR unit according to the embodiment for achieving the above object comprises a communication unit for communicating with the AMR unit, the MUC unit, the EI calculation unit, and the SP unit and a control unit for performing control so that information on a DR billing plan is provided to the customer based on the metering information received from the AMR unit and the EI information received from the EI calculation unit through the smart portal unit.

Furthermore, the control unit provides direct load service that enables the customer to select a DR use load based on the information on the DR billing plan or an emergency program that informs the customer that the DR bill based on the information on the DR billing plan is abnormal through the SP unit.

Meanwhile, the SP unit according to the embodiment for achieving the above object comprises a communication unit for communicating with the DR unit, a DR information supply unit for providing the customer with information on a DR billing plan, received from the DR unit, in a specific form, a data input unit for receiving a specific selection or specific data for the information on the DR billing plan from the customer, a DR bill setting unit for setting utility meters and a bill based on the information on the DR billing plan according to the customer's selection, a customer notification unit for informing the customer of a change of a use of the utilities based on a criterion set by the customer, and a control unit for controlling an operation of providing the information on the DR billing plan to the customer, an operation of receiving selection information from the customer, or an operation of the customer being informed.

Meanwhile, a demand response service method using a smart portal according to the embodiment for achieving the above object is a demand response service method using a smart portal of a system, including an AMR unit, an MUC unit, an EI calculation unit, a DR unit, and a SP unit, the demand response service method comprising the steps of (a) the AMR unit generating metering information by reading each consumer's utility meters, (b) the MUC unit providing information on DR bill calculations for calculating a DR bill for the metering information, (c) the EI calculation unit calculating an EI customized for the each consumer based on the metering information, (d) the DR unit calculating a CBL for the each consumer and providing information on a DR billing plan based on the CBL, the EI, and the information on the DR bill calculations, and (e) the SP unit providing the information on the DR billing plan to the customer in a specific form.

Meanwhile, a demand response service method of the EI calculation unit according to the embodiment for achieving the above object comprises the steps of (a) receiving the metering information of each consumer's utility meters from the AMR unit, (b) calculating the EI customized for the each consumer based on the metering information, and (c) transferring the calculated EI to the DR unit.

Furthermore, the EI includes economic information, environmental information, and social information.

Furthermore, the economic information includes a use history and information on a bill and meters.

Furthermore, the EI classified into a customer EI, a utility supplier EI, and a city EI, and the EI comprises an environmental information index, an Eco-friendly behavior index, and a utility consumption/supply efficiency index.

Furthermore, the social information is ranking information on the economic information and the environmental information, and the social information includes information on EIs of an individual and a city, a bill, and meters.

Meanwhile, a demand response service method using a smart portal of the DR unit according to the embodiment for achieving the above object is a demand response service method using a smart portal of the DR unit for communicating with an AMR unit, an MUC unit, an EI calculation unit, and a SP unit, comprising the steps of (a) receiving metering information on each consumer's utility meters from the AMR unit, DR bill calculation information from the MCU unit, and EI information customized for the each consumer from the EI calculation unit, (b) calculating a CBL of the each consumer based on the metering information, (c) calculating information on a DR billing plan based on the CBL, the EI, and the information on the DR bill calculation, and (d) providing the calculated information on the DR billing plan to the customer through the SP unit.

Figure 1:
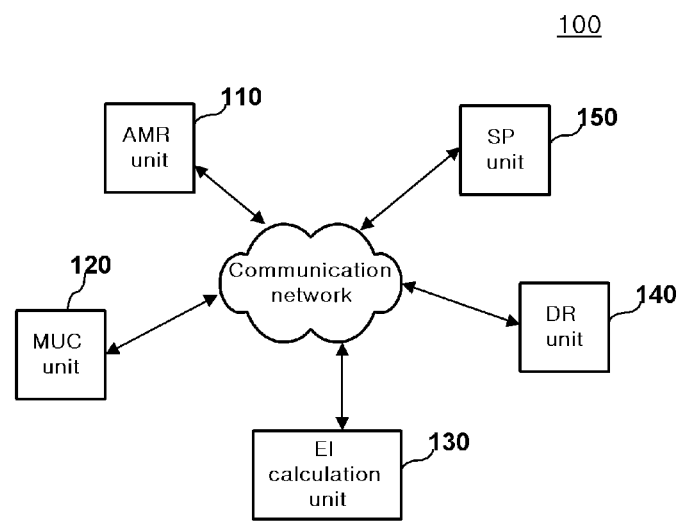
FIG. 1 is a configuration diagram showing the entire construction of a demand response system using a smart portal according to an embodiment of the disclosure.

<Description of reference numerals of principal elements in the drawings>

| | |
|---|---|
| 100: DR system | 110: AMR unit |
| 120: MUC unit | 130: EI calculation unit |
| 140: DR unit | 150: SP unit |
| 210: communication unit | 220: utility management unit |
| 230: DR information supply unit | 240: control unit |
| 310: communication unit | 320: EI calculation unit |
| 330: control unit | 410: communication unit |
| 420: control unit | 510: communication unit |
| 520: DR information supply unit | 530: data input unit |
| 540: DR bill setting unit | 550: customer notification unit |

DETAILED DESCRIPTION OF THE EMBODIMENT

An embodiment of the disclosure and detailed contents of the descriptions about technical configurations and the operational effects thereof will be more clearly understood from the following detailed description based on the drawings attached in the specification of the disclosure. Embodiments of the disclosure are described in detail below with reference to the attached drawings.

FIG. 1 is a configuration diagram showing the entire construction of a demand response system using a smart portal according to an embodiment of the disclosure.

Referring to FIG. 1, the demand response system 100 using a smart portal according to the embodiment includes an Automatic Meter Reading (hereinafter referred to as an 'AMR') unit 110, a Multi Utility Complex (hereinafter referred to as an 'MUC') unit 120, an Eco Index (hereinafter referred to as an 'EI') calculation unit 130, a DR unit 140, and a Smart Portal (hereinafter referred to as an 'SP') unit 150.

The AMR unit 110 generates metering information by reading each customer's utility meters.

The MUC unit 120 collectively manages the utilities of each consumer and provides information on DR bill calculations for calculating a DR bill on the basis of the metering information.

The EI calculation unit 130 calculates an EI customized for each consumer on the basis of the metering information.

The DR unit 140 calculates CBL information on the basis of the metering information, calculates a DR bill on the basis of the calculated CBL information, the DR information, and the EI, and outputs the calculated DR bill.

The SP unit 150 provides the calculated DR bill to a user in a specific form.

Figure 2:
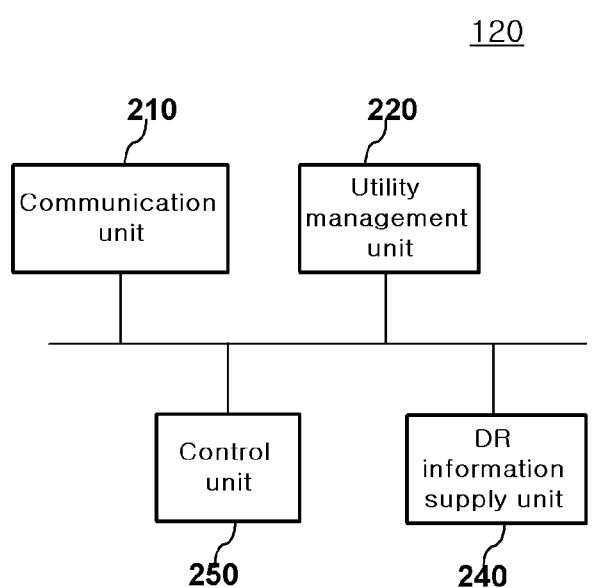
FIG. 2 is a configuration diagram showing the function blocks of an MUC unit according to an embodiment of the disclosure.

FIG. 2 is a configuration diagram showing the function blocks of the MUC unit according to the embodiment.

Referring to FIG. 2, the MUC unit 120 according to the embodiment includes a communication unit 210, a utility management unit 220, a DR information supply unit 230, and a control unit 240.

The communication unit 210 communicates with the AMR unit 110 and the DR unit 140 over a communication network.

The utility management unit 220 collectively manages utilities on the subject of metering of the AMR unit 110.

The DR information supply unit 230 provides the information on the DR bill calculations, including limit price information, income correction information, and CBL setting information for each utility.

The control unit 240 controls the management of each utility and the providing of the information on the DR bill calculations for each utility.

Figure 3:
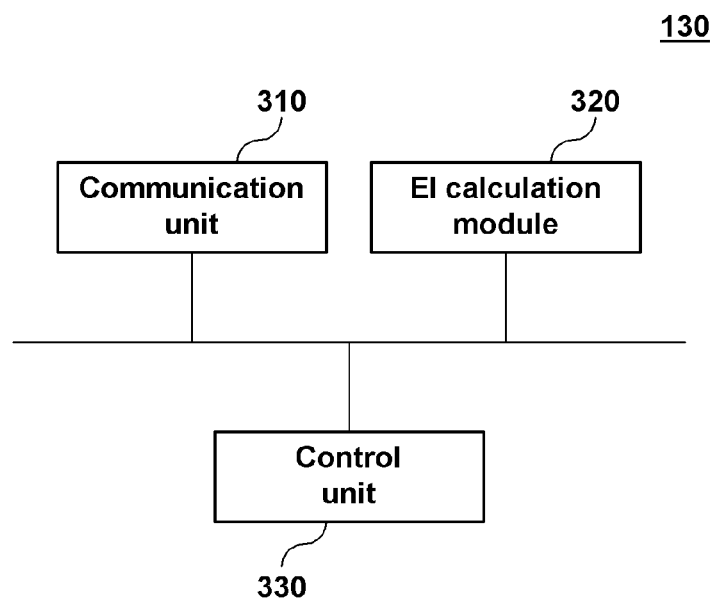
FIG. 3 is a configuration diagram showing the function blocks of an EI calculation unit according to an embodiment of the disclosure.

FIG. 3 is a configuration diagram showing the function blocks of the EI calculation unit according to an embodiment of the disclosure.

Referring to FIG. 3, the EI calculation unit 130 according to the embodiment includes a communication unit 310, an EI calculation module 320, and a control unit 330.

The communication unit 310 communicates with the AMR unit 110 and the DR unit 140 over a communication network.

The EI calculation module 320 calculates an EI customized for each consumer on the basis of the metering information received from the AMR unit 110.

Here, the EI includes economic information, environmental information, and social information.

Furthermore, the economic information includes information on a bill and meters and a use history.

Furthermore, the EI classified into a customer EI, a utility supplier EI, and a city EI, and the EI comprises an environmental information index, a eco-friendly behavior index, and a utility consumption/supply efficiency index.

Furthermore, the social information is ranking information on the economic information and the environmental information, and it includes information on the EIs, bills, and meters of an individual and a city.

The control unit 330 controls the calculated EI so that it is transferred to the DR unit 140.

Figure 4:
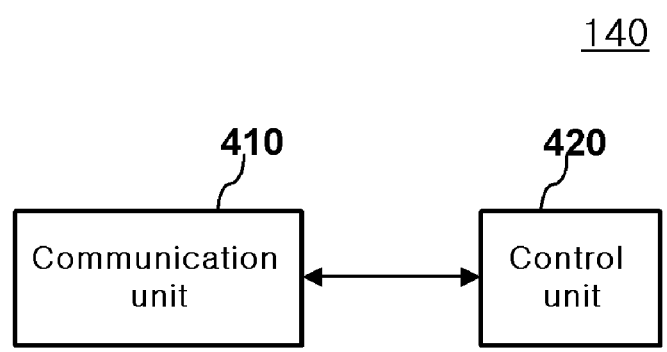
FIG. 4 is a configuration diagram showing the major function blocks of a DR unit according to an embodiment of the disclosure.

FIG. 4 is a configuration diagram showing the major function blocks of the DR unit according to an embodiment of the disclosure.

Referring to FIG. 4, the DR unit 140 according to the embodiment includes a communication unit 410 and a control unit 420.

The communication unit 410 communicates with the AMR unit 110, the MUC unit 120, the EI calculation unit 130, and the SP unit 150 over a communication network.

The control unit 420 performs control on the basis of the metering information received from the AMR unit 110 and the EI information received from the EI calculation unit 130 so that information on a DR billing plan is provided to a customer through the SP unit 150.

Furthermore, the control unit 420 provides direct load service that enables a customer to select a DR use load based on the information on the DR billing plan and an emergency program that informs a customer that a DR bill based on the information on the DR billing plan is abnormal, if any, through the SP unit 150.

Figure 5:
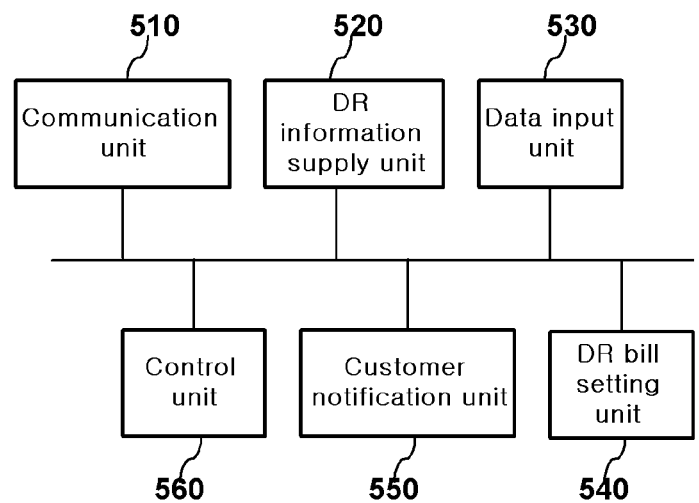
FIG. 5 is a configuration diagram showing the function blocks of an SP unit according to an embodiment of the disclosure.

FIG. 5 is a configuration diagram showing the function blocks of the SP unit according to an embodiment of the disclosure.

Referring to FIG. 5, the SP unit 150 according to the embodiment includes a communication unit 510, a DR information supply unit 520, a data input unit 530, a DR bill setting unit 540, a customer notification unit 550, and a control unit 560.

The communication unit 510 communicates with the DR unit 140 over a communication network.

The DR information supply unit 520 provides a customer with the information on the DR billing plan, received from the DR unit 140, in a specific form.

The data input unit 530 receives a specific selection or specific data for the information on the DR billing plan from a customer.

The DR bill setting unit 540 sets utility meters and a bill based on the information on the DR billing plan according to a customer's selection.

The customer notification unit 550 informs a customer that there is a change of the use of a utility on the basis of a criterion set by the customer.

The control unit 560 controls an operation of providing the information on the DR billing plan to the customer, an operation of receiving selection information from the customer, an operation of providing notification to the customer, and so on.

Meanwhile, a specific survey institute revealed that the Korean's consumption types are classified into 5 types, including a negative type, a personality type, a positive type, a prudent type, and a promotion hunter, according to a life style as in Table 1 below.

TABLE 1

| Type | Contents | Ratio |
| --- | --- | --- |
| Negative type | Indifferent to a fashion and sales promotion | 24.3% |
| Personality type | Interested in leisure and diversity | 23.7% |
| Positive type | Actively interested in all the aspects of price, sales promotion, and a fashion | 15.2% |
| Prudent type | Planned consumption | 11.3% |
| Promotion hunter | Actively utilize price discount and sales promotion | 25.5% |

From among them, types who are sensitive to a bill and a price change and actively consume are the positive type and the promotion hunter type and occupy the total ratio of 40%. It shows that it is difficult to determine a consumption type on the basis of only a bill. Furthermore, it shows that electric charges of about 20% can be reduced through a DR billing plan, an actual converted amount is less than 10,000 Won per month. It is insufficient for a positive motive of a user. Accordingly, there is a need to provide another form of information.

Figure 6:
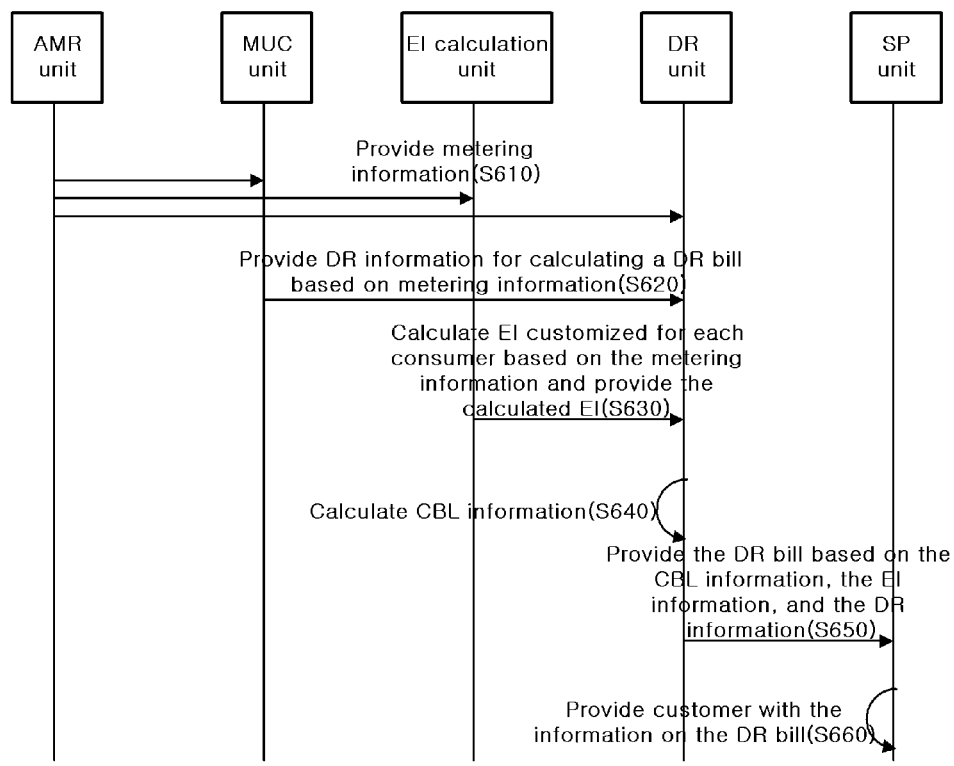
FIG. 6 is the entire flowchart illustrating a demand response service method using a smart portal according to an embodiment of the disclosure.

FIG. 6 is the entire flowchart illustrating a demand response service method using a smart portal according to an embodiment of the disclosure.

Referring to FIG. 6, the AMR unit 110 provides metering information read for each consumer's utility meters to the MUC unit 120, the EI calculation unit 130, and the DR unit 140 (S610).

Next, the MUC unit 120 provides the DR unit 140 with information on DR bill calculations for calculating a DR bill on the metering information (S620).

Next, the EI calculation unit 130 calculates an EI customized for each consumer on the basis of the metering information and provides the calculated EI to the DR unit 140 (S630).

Next, the DR unit 140 calculates CBL information on each consumer (S640) provides the SP unit 150 with information on a DR billing plan based on the CBL information, the EI information, and the information on the DR bill calculations (S650).

Next, the SP unit 150 provides the customer with the information on the DR billing plan in a specific form, for example, a web posting form, an e-mail form, or an SMS message form (S660).

Figure 7:
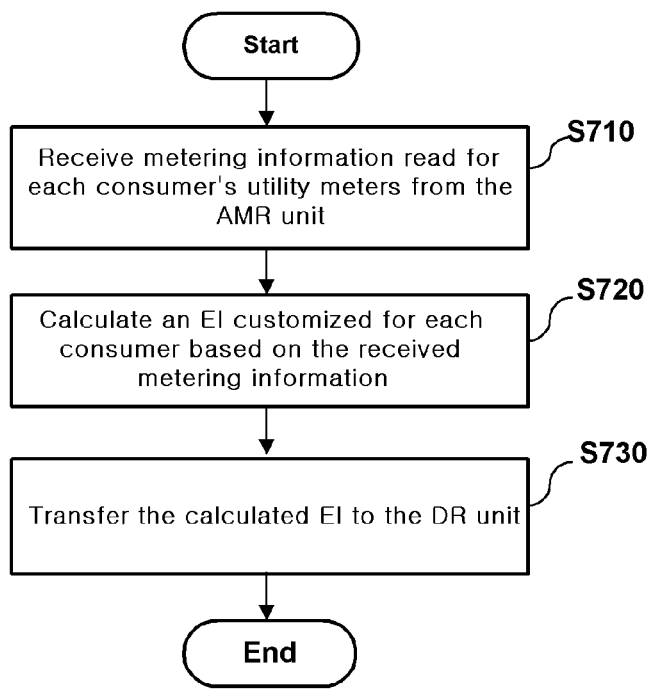
FIG. 7 is an operational flowchart of the EI calculation unit for illustrating a demand response service method of the EI calculation unit according to an embodiment of the disclosure.

FIG. 7 is an operational flowchart of the EI calculation unit for illustrating a demand response service method of the EI calculation unit according to an embodiment of the disclosure.

Referring to FIG. 7, the EI calculation unit 130 according to the embodiment receives metering information read for each consumer's utility meters from the AMR unit 110 (S710).

Next, the EI calculation unit 130 calculates an EI customized for each consumer through the EI calculation unit 320 on the basis of the received metering information (S720).

Next, the EI calculation unit 130 transfers the calculated EI to the DR unit 140 (S730).

Here, the EI includes economic information, environmental information, and social information.

Here, the economic information includes information on a bill and on meters and a use history.

The DR billing plan is announced for every hour before 1 hour through the SP unit 150, and a customer (user) can make a power consumption plan with reference to the DR billing plan. The customer can also determine a consumption behavior direction on the basis of a current bill calculated in real time.

In the embodiment, the environmental information needs to be taken into consideration as a sensible part along with the economic information appealing to rationality. A customer may be encouraged to pride himself as a cultured man who protects an environment and rightly acts socially for the behalf of his children and descendants if he actively reacts to information and manages utilities.

Accordingly, the EI classified into a customer EI, a utility supplier EI, and a city EI, and the EI comprises an environmental information index, an Eco-friendly behavior index, and a utility consumption/supply efficiency index.

Table 2 below is an example showing a customer EI.

TABLE 2

| Region | Indicator | Definition | Marks |
|---|---|---|---|
| An environmental information index (Clean EI) | $CO_2$ emissions | Value obtained by converting monthly utility meters into $CO_2$ emissions | 100 = 80% of the mean per capita in 2005 in a nation = 150% of the mean per capita in 2005 in the nation |
| | New and renewal energy electric power amount | Ratio of self-electric generation (kWh) of new and renewal energy in total power consumption (kWh) | 0~100 |
| Utility consumption efficiency index | Resource recycling | Mean value of a waste recycling ratio and a heavy water utilization ratio | 0~100 |

In Table 2, for example, in the clean EI region, when an index indicator is $CO_2$ emissions, the customer EI refers to a value obtained by converting the monthly utility meters into $CO_2$ emissions. An index customized for the clean EI region is calculated as a number from 0 to 100.

Furthermore, in the clean EI region, when an index is the amount of new and renewal energy electric power, the customer EI refers to a ratio of self-electric generation (kWh) of new and renewal energy in the total power consumption (kWh).

Furthermore, in the utility consumption efficiency index region, the customer EI refers to the mean value of a waste recycling ratio and a heavy water utilization ratio, and it is calculated as a number from 0 to 100.

Table 3 below is an example showing a utility supplier EI.

TABLE 3

| Region | Indicator | Definition | Marks |
|---|---|---|---|
| Utility supply efficiency index | Resource recycling | Mean of a heavy water supply ratio and a waste recycling ratio | 0~100 |
| | Utility supply efficiency | Value in which the mean of utility supply facility operation inefficiency has been subtracted from 100 | 0~100 |
| Eco-friendly behavior index | Environment quality | Mean of an air quality index and a water quality index | 0~100 |
| | Amount of reduced demands | Ratio of consumption, reduced by a DR, to predicted peak consumption | 0~100 |
| | Ratio of new and renewal energy electric power | Ratio of the amount (kWh) of new and renewal energy electric power in the total amount of power electric power (kWh) | 0~100 |

In Table 3, in the utility supply efficiency index region, the utility supplier EI refers to the mean of a heavy water supply ratio and a waste recycling ratio when an index is resource recycling and refers to a value in which utility supply facility operation inefficiency has been subtracted from 100 when an index is utility supply efficiency.

Furthermore, in the eco-friendly behavior index region, the environment quality refers to the mean of an air quality index and a water quality index when an index is the environment quality, and the amount of reduced demands refers to the ratio of consumption, reduced by a DR, to predicted peak consumption when an index is the amount of reduced demands.

Furthermore, in the eco-friendly behavior index region, when an index is the ratio of new and renewal energy electric power, the ratio of new and renewal energy electric power refers to the ratio of the amount of new and renewal energy electric power in the total amount of power electric power.

Table 4 below is an example showing a city EI.

TABLE 4

| Region | Indicator | Definition | Marks |
|---|---|---|---|
| An environmental information index (Clean EI) | $CO_2$ emissions per capita | Value in which a value obtained by converting total utility meters into $CO_2$ emissions is divided by the total population in a city | 100 = 80% of the mean per capita in 2005 in a nation = 150% of the mean per capita in 2005 in the nation |
| | Water quality of water source | Water quality index of water source | 0~100 |
| | Amount of new and renewal energy electric power | Ratio of the total amount (kWh) of new and renewal energy electric power in the total amount of power consumption (kWh) in a city | 0~100 |
| Utility consumption efficiency index | Resource cycling | Mean of a waste recycling ratio and a heavy water utilization ratio in the entire city | 0~100 |

In Table 4, in the clean EI region, when an index is $CO_2$ emissions per capita, the $CO_2$ emissions per capita refers to a value in which a value obtained by converting total utility meters into $CO_2$ emissions is divided by the total population in a city.

Furthermore, in the clean EI region, the water quality of water source refers to the water quality index of water source when an index is the water quality of water source and the amount of new and renewal energy electric power refers to the ratio of the total amount of new and renewal energy electric power in the total amount of power consumption in a city.

Furthermore, in the utility consumption efficiency index region, when an index is resource recycling, the resource cycling refers to the mean of a waste recycling ratio and a heavy water utilization ratio in the entire city.

Furthermore, the social information is ranking information on the economic information and the environmental information, and it includes information on the EIs of an individual and a city, a bill, and meters.

That is, if the economic and environmental information is information corresponding to an individual, the social information refers to information on a relationship involved with the others. Accordingly, social factors are combined with a personal pride that may be obtained based on the economic information and the environmental information, and thus the social information is converted into a social reputation and recognized. The DR system as a contention not a personal conscience and decision may expect a consumer reaction more effectively.

Here, in a method of providing the ranking information, each consumer's utility meters is read through the AMR unit 110. Next, the read metering information is stored, and a bill is calculated in real time according to a DR billing plan. Priority is calculated on the basis of information gathered in a predetermined cycle (daily or weekly). A user controls demands on the basis of the ranking information.

Figure 8:
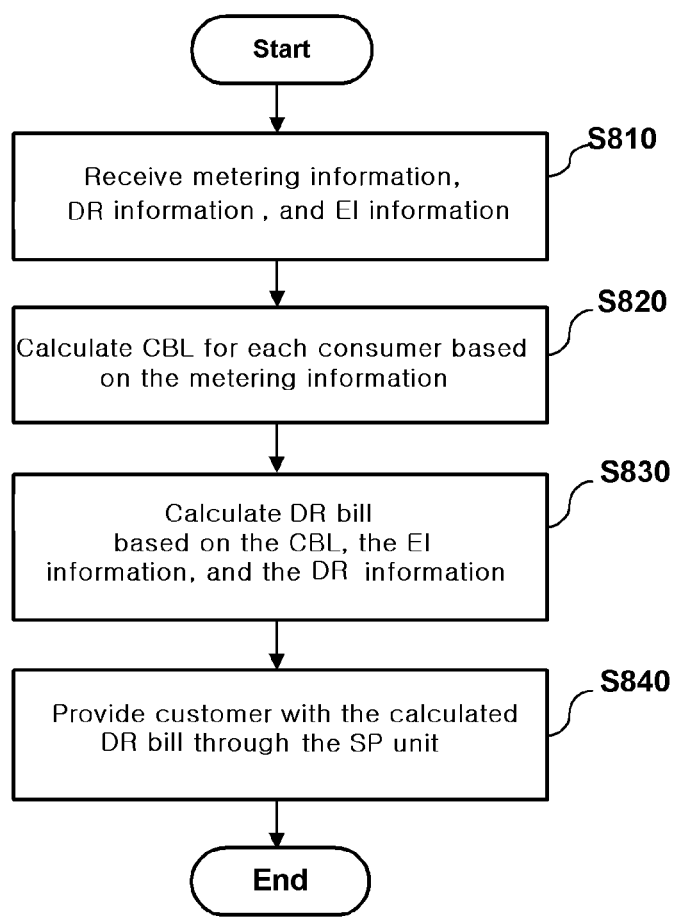
FIG. 8 is an operational flowchart of the DR unit for illustrating a demand response service method of the DR unit using a smart portal according to an embodiment of the disclosure.

FIG. 8 is an operational flowchart of the DR unit for illustrating a demand response service method of the DR unit using a smart portal according to an embodiment of the disclosure.

Referring to FIG. 8, the DR unit 140 according to the receives metering information for each consumer's utility meters from the AMR unit 110, information on DR bill calculations from the MUC unit 120, and EI information customized for each consumer from the EI calculation unit 130 (S810).

Next, the DR unit 140 calculates a CBL for each consumer on the basis of the metering information (S820).

Next, the DR unit 140 calculates information on a DR billing plan on the basis of the CBL, the EI information, and the information on the DR bill calculations (S830).

Furthermore, the DR unit 140 provides the customer with the calculated information on the DR billing plan through the SP unit 150 in a specific form (S840).

Here, the specific form may include, for example, a posting form. Although a web is used as a posting tool in the embodiment, a variety of methods, such as a metering meter, may be added. The method, however, is the same in that information may be posted and obtained according to a user's active behavior. Accordingly, this method is efficient for a consumer who is active and has an active consumption propensity.

Furthermore, in the system of the embodiment, e-mail and Short Message Service (SMS) are used in addition to the above method. If web posting, e-mail, and SMS are classified on the basis of the active property of a consumer, the acquisition of information of a posting form may be the most active method, e-mail is a neutral method because it differs according to a user form, and SMS may be a passive method.

The e-mail providing method may be used in an active or passive form according to a use form of a customer. However, the system provides information in a push form unlike in the web posting method.

The SMS providing method is a method of prompting a user's behavior in real time. Like in e-mail, the system can receive information by pushing the information and acquire the information in real time. Accordingly, SMS may also be used as an alert in addition to the information provided through a web and e-mail. If there is a change of a utility use, such as meters and a bill, because a user meets a set criterion, a user behavior may be controlled by immediately informing the user of the change through an SMS message. In the present system, direct load control and emergency program service can be provided, and a user may be informed of the direct load control and the emergency program service through e-mail and SMS when the service is operated.

The information providing method of the system according to the embodiment may be summarized as in Table 5 below according to a degree of an active property, the existence of a user' recognition, and promptness.

TABLE 5

| Information providing method | Active property | User recognition | Promptness |
|---|---|---|---|
| Web posting | High | ○ | X |
| E-mail | Middle | X | X |
| SMS | Low | X | ○ |

A smart grid system administrator and a utility supplier can use and manage a method appropriate for a situation in order to meet predicted demands by using a variety of information providing methods having different characteristics.

As described above, according to the embodiment, a demand response system and method using a smart portal, an AMR unit, an MUC unit, an EI calculation unit, a DR unit, an SP unit, a demand response service method of the EI calculation unit, and a demand response service method of the DR unit can be realized in which a CBL is calculated based on the analysis of usage data and information on a DR billing plan for a utility use is provided to a customer by taking the calculated CBL into consideration by using a smart portal such that the customer can control demands for himself in order to efficiently manage user demands by changing the existing utility 'supply' system (i.e., 'billing for the past use') into a utility 'purchase' system (i.e., 'pre-billing for the future use') in a smart grid environment where utilities, such as water/sewage, gas, electricity, and heating/air-conditioning, are combined and managed within an area.

Those having ordinary skill in the art to which the disclosure pertains will appreciate that the disclosure may be implemented in other detailed forms without changing the technical spirit or indispensable characteristics. Accordingly, it should be understood that the above-described embodiments are only illustrative from all aspects and are not to be restrictive. The scope of the disclosure is defined by the following claims rather than the detailed description, and the meanings and scope of the claims and all changes or modified forms induced from their equivalents should be interpreted to fall within the scope of the disclosure.

INDUSTRIAL APPLICABILITY

The disclosure may be applied to a smart grid system that targets the protection of an environment, the utilization of new and renewal energy, a reduction of facility costs, and a reduction of consumer expenses by combining and managing utilities, such as water/sewage, gas, electricity, and heating/air-conditioning, with an area.

Furthermore, the disclosure may be in overseas integrated utility supply facilities and may be used in the operating systems of utility supply facilities.

The invention claimed is:

1. A demand response service method performed by a demand response system including an Automatic Meter Reading (AMR) unit, a Multiple Utility Complex (MUC) unit, an Eco Index (EI) calculation unit, a Demand Response (DR) unit, and a Smart Portal (SP) unit, the demand response service method comprising:
generating, by the AMR unit, metering information by reading amount used for a utility;
providing, by the MUC unit, DR information based on the metering information, for a user to control demands for a utility usage;
calculating, by the EI calculation unit, an EI based on the metering information;

calculating, by the DR unit, Customer Baseline Load (CBL) based on the metering information by analyzing a form of the utility usage for the user; and
calculating, by the DR unit, a DR bill based on the calculated CBL, the EI and the DR information; and
providing, by the SP unit, a user with the DR bill in order for the user
  to control the demands for the utility usage, and
  to purchase the utility in pre-billing for a future usage based on the DR bill,
wherein the calculating of the EI based on the metering information comprises:
  receiving the metering information from the AMR unit;
  calculating the EI based on the metering information; and
  transferring the calculated EI to the DR unit.

2. The demand response service method according to claim 1, wherein the EI is classified into a customer EI, a utility supplier EI and a city EI, and
  the EI comprises an environmental information index, an Eco-friendly behavior index, and a utility consumption and supply efficiency index.

* * * * *